A. MAIRE.
MEANS FOR FITTING UP SCREW PROPELLER HUBS UPON THEIR SHAFTS.
APPLICATION FILED JAN. 2, 1919.

1,346,665.

Patented July 13, 1920.

Inventor
Auguste Maire
by his Attorney

UNITED STATES PATENT OFFICE.

AUGUSTE MAIRE, OF ARGENTEUIL, FRANCE, ASSIGNOR TO SOCIETE LORRAINE DES ANCIENS ETABLISSEMENTS DE DIETRICH & CIE. DE LUNEVILLE, OF PARIS, FRANCE.

MEANS FOR FITTING UP SCREW-PROPELLER HUBS UPON THEIR SHAFTS.

1,346,665.  Specification of Letters Patent.  Patented July 13, 1920.

Application filed January 2, 1919. Serial No. 269,385.

*To all whom it may concern:*

Be it known that I, AUGUSTE MAIRE, citizen of the Republic of France, residing at Route de Bezons, Argenteuil, Seine-et-Oise, in the Republic of France, have invented new and useful Improvements in Means for Fitting Up Screw-Propeller Hubs Upon Their Shafts, of which the following is a specification.

This invention relates to improved means for fitting up screw propeller hubs upon their shafts, the characteristic feature of which is that the locking of the hub on the shaft as well as its unlocking therefrom are effected by a nut having a collar which is screwed upon the end of the shaft and bears upon a shoulder piece inside the hub, and by a lock nut having a thread reverse to that of the first nut and screwed within the body of the hub, so that when driven home, its inner end leaves a certain amount of play between the same and the nut collar; the nut and the lock nut being pinned together after being screwed on. This construction allows to effect the unlocking after having first unpinned the nuts by merely loosening the first nut which may be done owing to the play, left between the inner end of the lock nut and the nut collar.

In the accompanying drawings, Figure 1 is a cross section of this improved hub.

Fig. 2 is an end view of the same.

Fig. 3 is a view of the lock nut detached.

Figure 1:
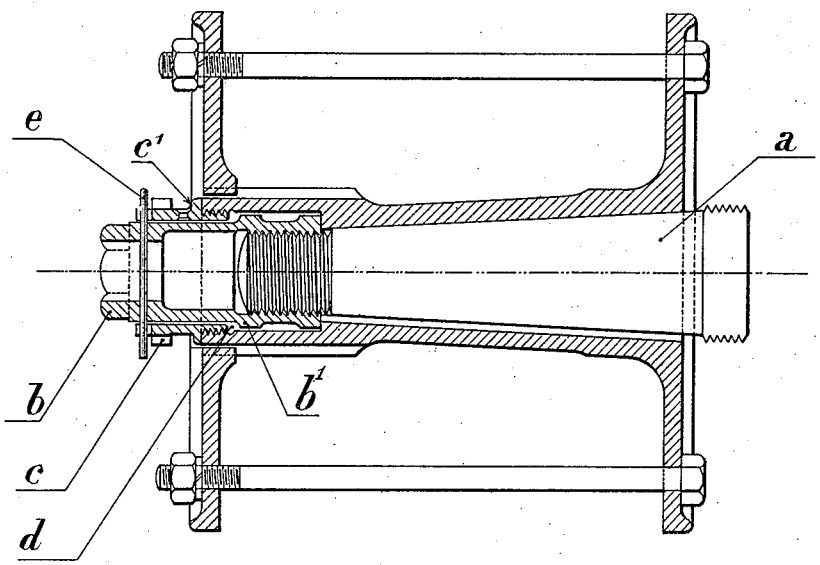
Figure 1:
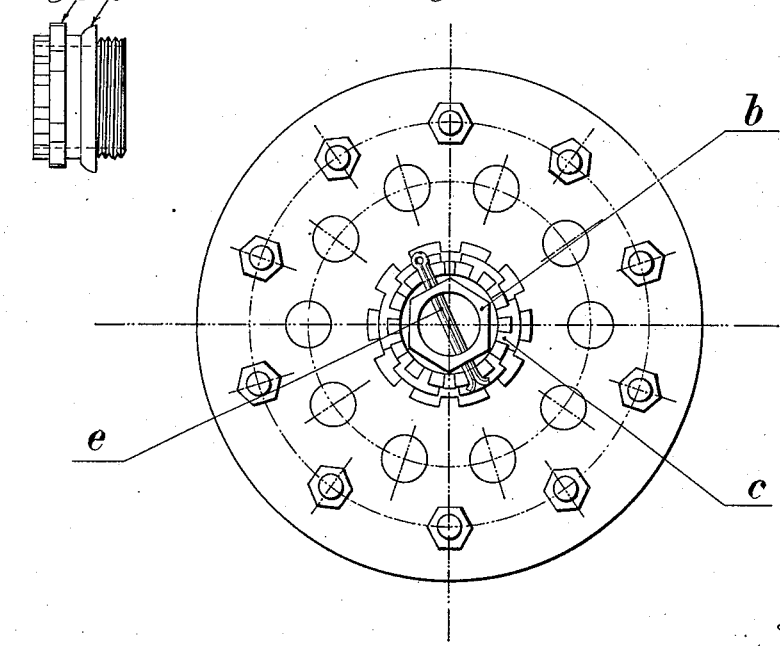

The hub is in a general way of usual construction. Its bore is a cone which engages the end of the crank shaft $a$. The hub is tightened upon this shaft by a nut $b$ having a collar $b^1$; a lock nut $c$ the thread of which is reversed to that of the former nut is screwed in the body of the hub proper and is provided with a flange $c^1$ in such a manner that there may be always a certain amount of play $d$ left between the front end of this lock nut—even when screwed home—and the rear part of the collar $b^1$ of the nut; a stout split pin $e$ connects the nut and the lock nut together, entering a diametrical hole of the nut and radial notches formed at the rear end of the lock nut. The nut and the lock nut having reverse threads, neither of these two pieces can move under the action of shocks or vibrations.

To unlock, it is sufficient to withdraw the pin $e$ and to loosen the nut $b$ with a spanner; this loosening can always take place owing to the play $d$; the nut collar $b^1$ abuts then against the lock nut $c$ and while continuing to act on the screw $b$ to unloosen the parts, the nut $b$ bears upon the thread of the screw propeller shaft on the one hand and upon the lock nut $c$ by its collar on the other hand, so as to cause a longitudinal displacement of the screw propeller hub relatively to the shaft, thus facilitating the unlocking operation.

The sides or cheeks of the hub are provided on their periphery with a stiffening rib or collar which prevents them from warping when the bolts are tightened on the screw propeller.

Having now described my invention, what I claim as new and desire to secure by Letters Patent is:

1. Means for fitting up screw propellers upon their shafts comprising in combination a conical shaft and terminated by a screw threaded cylindrical part, a hub with a conical bore slipped over the end of the conical shaft, a cylindrical bore formed in the hub following the small base of the conical and having a larger diameter than this base so as to form a shoulder between the two bores, a tapping in the cylindrical bore by the side of its outer opening, a nut capable of engaging freely the cylindrical bore of the hub and screwed upon the threaded end of the shaft so as to abut against the inner shoulder of the hub, a collar formed upon the front part of the nut, a lock nut having a bore of sufficient diameter to slip freely over the nut, an outer screw thread formed on the front end of this lock nut, this thread being arranged to enter the tapped bore of the hub and having a pitch reversed to that of the tapped nut, a flange or abutment formed on the lock nut in such a manner as to leave always a certain amount of play between the front end of the lock nut—even when screwed home—and the rear of the nut collar and means for pinning together the nut and the lock nut after they are screwed up, substantially as described and for the purpose set forth.

2. Means for fitting up screw propellers upon their shafts, comprising in combination a conical shaft end terminated by a screw threaded cylindrical part, a hub with a conical bore slipped over the end of the conical shaft, a cylindrical bore formed in the hub following the small base of the conical bore and having, a larger diameter than this base so as to form a shoulder between the two bores, a tapping in the cylindrical bore by the side of its outer opening, a nut capable of engaging freely in the cylindrical bore of the hub and screwed upon the threaded end of the shaft so as to abut against the inner shoulder of the hub, a collar formed upon the front part of the nut and a cylindrical hole throughout the rear end of the nut, a lock nut having a bore of sufficient diameter to slip freely over the nut, an outer screw thread formed on the front end of this lock nut, this thread being arranged to enter the tapped bore of the hub and having a pitch reversed to that of the tapped nut, a flange or abutment formed on the lock nut in such a manner as to leave always a certain amount of play between the front end of the lock nut—even when screwed home—and the rear of the nut collar, radial notches formed at the rear end of the lock nut and a pin entering the rear cylindrical hole of the nut and the corresponding notches of the lock nut after the nut and lock nut have been screwed up, substantially as described and for the purpose set forth.

In testimony whereof I have signed my name to this specification.

AUGUSTE MAIRE.